No. 697,196. Patented Apr. 8, 1902.
E. CAMERON.
WEIGHING MACHINE.
(Application filed Apr. 10, 1901.)
(No Model.) 4 Sheets—Sheet 1.

WITNESSES:

INVENTOR
Evan Cameron
BY
Wm R. Baird,
ATTORNEY

No. 697,196. Patented Apr. 8, 1902.
E. CAMERON.
WEIGHING MACHINE.
(Application filed Apr. 10, 1901.)
(No Model.) 4 Sheets—Sheet 4.

WITNESSES:
INVENTOR
Ewan Cameron
BY
Wm R Baird,
ATTORNEY

UNITED STATES PATENT OFFICE.

EWAN CAMERON, OF BROOKLYN, NEW YORK.

WEIGHING-MACHINE.

SPECIFICATION forming part of Letters Patent No. 697,196, dated April 8, 1902.

Application filed April 10, 1901. Serial No. 55,206. (No model.)

*To all whom it may concern:*

Be it known that I, EWAN CAMERON, a citizen of the United States, residing in the borough of Brooklyn, county of Kings, city and State of New York, have invented certain new and useful Improvements in Weighing-Machines for Coal, &c., of which the following is a specification.

My invention relates particularly to devices adapted to be used in weighing coal, grain, crushed stone, or other like substances where it is desirable that the weighing process should take place automatically and without interrupting the stream of such substance from the vehicle or other receptacle being unloaded. Its objects, among others, are to strengthen and simplify the construction of the weighing-machine, to enhance its efficiency and durability, and to secure a more accurate measurement of the substance to be weighed. It is illustrated in the accompanying drawings referred to herein, and in which—

Figure 1:
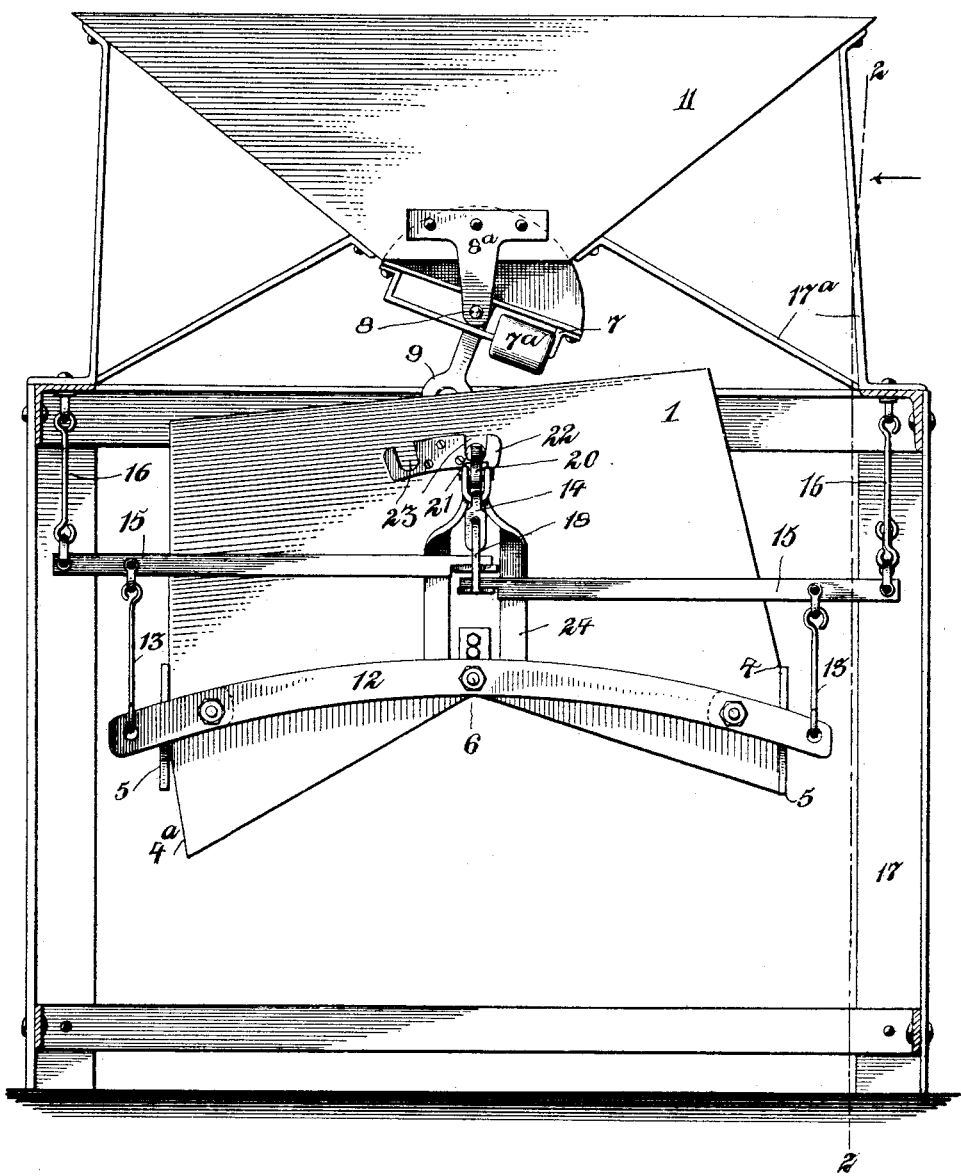
Figure 2:
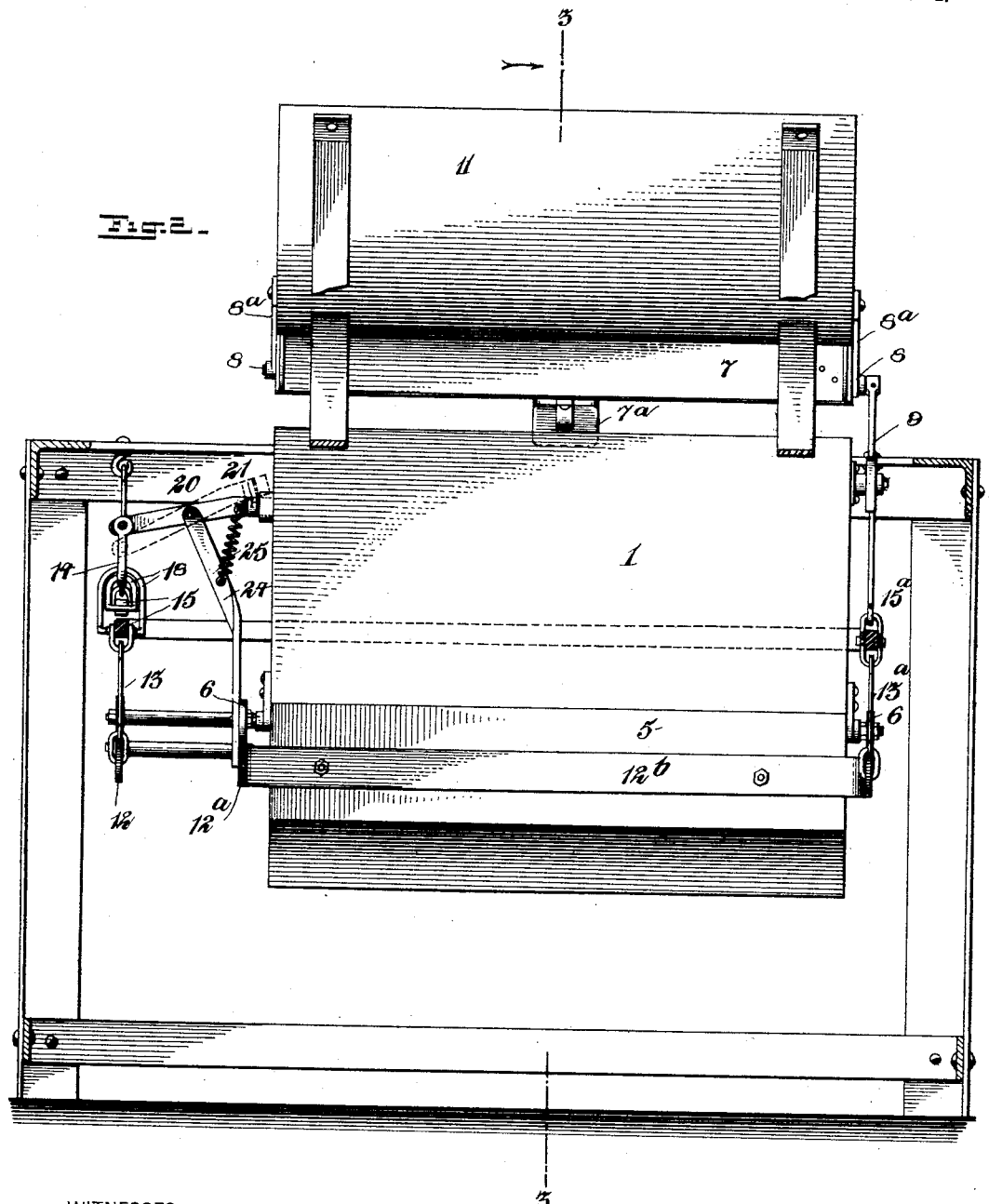
Figure 3:
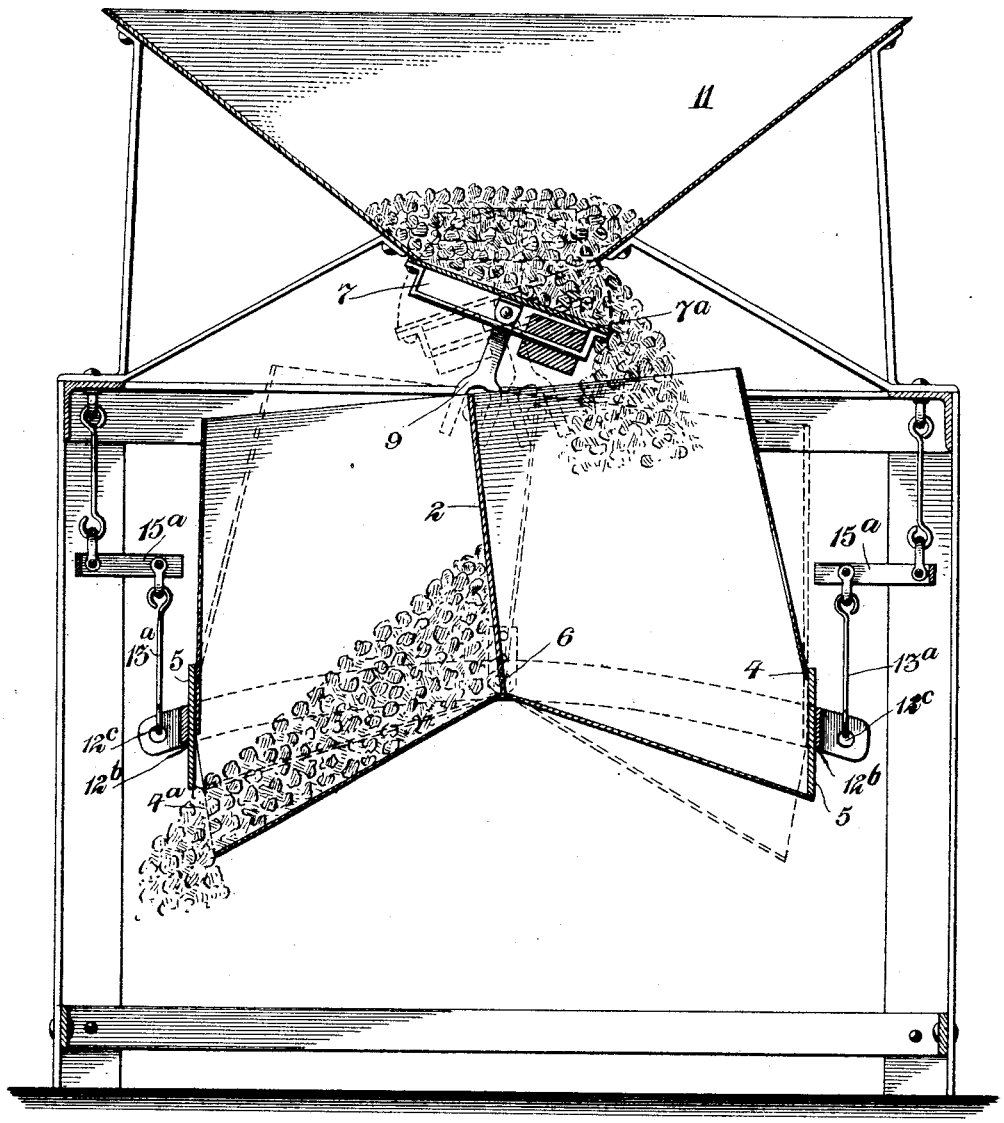
Figure 4:
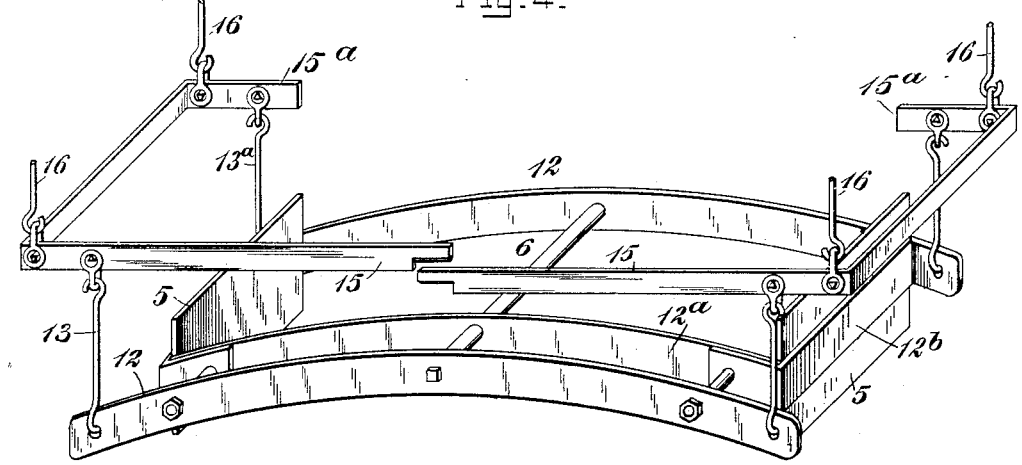
Figure 5:
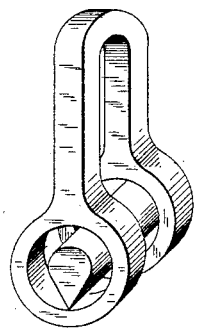

Figure 1 is an end view of a weighing-machine embodying my invention with a part of the frame upon which the operative parts of the device are supported cut away. Fig. 2 is a cross-section on line 2 2 of Fig. 1 looking in the direction of the arrow. Fig. 3 is a cross-section on line 3 3 of Fig. 2 looking in the direction of the arrow. Fig. 4 is a view of the hung frame and levers upon which the weighing-bucket is supported. Fig. 5 is an enlarged detail of one of the links by which the parts of the frame are suspended, showing the knife-edges.

A rectangular frame 17 supports the operating parts of the device, the hopper 11 being supported by braces $17^a$ above the main rectangular frame. From the upper edges of the frame 17 links 16 depend, upon which the entire weighing mechanism is supported. The levers 15 $15^a$ are each formed, preferably, of one continuous bar or strip of metal bent into an approximately U shape and have their fulcrums at the point of suspension from the links 16. The levers $15^a$ extend inwardly a short distance and sufficient to allow the attachment of link $13^a$, by which one side of the lower frame is suspended, as at $12^a$. The other side of the lower frame is suspended by links 13 at points equidistant from the fulcrums of levers 15. These levers, it will be seen, belong to what is designated the "third" class, the inner ends of the levers 15 being the point where the weight is to be overcome.

The two-part bucket 1 is secured within the frame by the bar 6, running through its lower part, which acts as a pivot, allowing the said bucket to oscillate freely thereon. It is divided centrally by partition 2 and has openings $4^a$ at the bottom of the sides 4, which are adapted to be opened and closed as the said bucket oscillates by the gates 5, secured on the bars $12^b$ of the lower frame.

The tilting table 7 is pivoted upon a pin 8, secured on a hanger $8^a$ on the lower part of the hopper 11 and tilts in one direction or the other as the bucket oscillates, being assisted in this movement by a sliding weight $7^a$. The object of this tilting table is to interrupt the stream of coal or other substance passing out of the hopper, and thus destroy the impact of the same and also to give direction to the said stream, so that it will pass alternately into one compartment or the other of the bucket. The tilting of the table is accomplished by means of the dowel $9^a$ on the upper part of the bucket, which engages the forked end of the arm 9, extending downwardly from the table.

The oscillation of the bucket is accomplished by the following mechanism: The inner ends of the levers 15 impinge upon a double stirrup 18, depending from link 14 on the outer end of the lever 20, which is fulcrumed at the upper end of the bracket 24, secured to bar $12^a$ of the main frame, said lever having a downward-pulling tension-spring 25 near its opposite and inner end. The extreme inner end of the lever is provided with an antifriction-roller 21, which engages alternately the slots 23 of the cleat 22.

When it is desired to tilt the bucket as soon as one hundred pounds is in one compartment, the spring 25 is set to balance the weight of the hopper and the rest of the working parts plus twelve and one-half pounds, in consequence of which the pull on the outer end lever 20 must overcome the retraction of this spring before the roller 21 is lifted out of a slot 23 of cleat 22 and the hopper can oscillate. Regulating the tension on the spring 25 controls the amount to be weighed.

In Fig. 1 the coal is shown as coming into the right-hand compartment of the bucket. This brings the weight to bear upon pin 6 of the frame and depresses the entire frame, which is hung on links 13 13ª, suspended from the levers 15 and 15ª. The length of the levers 15 is such that the distance between the suspending-point and the fulcrum is one-eighth of the distance between the suspending-point and the connection of the stirrup 18 of lever 20. The weight of the coal falling into the right-hand compartment of the bucket pulls down the link 14, which in turn pulls down the outer end of the lever 20 against the traction of the spring, the spring being so set that a pull on it of twelve and one-half pounds plus the pull caused by the weight of the working parts will lengthen the spring sufficiently to just permit the roller 21 on the end of the lever 20 to rise high enough to become disengaged from the slot in which it has been resting; but the ratio of the lengths of the two portions of the lever 15 to each other is as one to eight, so that it takes one hundred pounds plus the weight of the working parts upon the frame to produce a pull of twelve and one-half pounds (one-eighth of one hundred) at the end of the spring, and the traction of the spring is not overcome until one hundred pounds is in the hopper.

The operation of the device is as follows: The coal or other substance to be weighed passes into the hopper 11, striking the tilted table 7 and passing over the same into one of the bucket-compartments. When the required amount has entered this compartment, the frame 12 12ª 12ᵇ, upon which the bucket is pivoted and which in turn is hung from levers 15 15ª, descends slightly, thus causing the levers 15 to pull down the outer end of the lever 20 and cause the inner end of said lever to pass upwardly out of the slot on one side of cleat 22. The bucket will then tilt toward the loaded side until the opening 4ª passes below the gate 5, allowing the contents to pass out therethrough. The tilting of the bucket also tilts the table 7 in the opposite direction, so that it will immediately change the direction of the stream into the opposite side of the bucket. As soon as a small portion of the contents has escaped, thus reducing the weight, the roller 21 at the inner end of the lever 20 is drawn down into the opposite slot 23 by the spring 25, thus retaining the bucket in position until a sufficient quantity of coal or other substance has entered the uppermost compartment to again depress the outer end of the lever 20, and thus release the roller 21 on the opposite end from engagement with the slot. In this manner it will be seen that a continuous stream of coal or other substance is maintained during the weighing operation, and the oscillation of the bucket may be recorded in any suitable manner, the resistance of the spring 25 being such as to require a certain predetermined weight in the bucket to overcome it. Thus, for instance, it may be of such a strength that two hundred and fifty pounds of coal are required to tilt the bucket. It is obvious then that each oscillation of the bucket will indicate that five hundred pounds have passed therethrough.

One of the chief advantages of my device is its accuracy, which is insured by the lack of frictional contacts throughout, the entire weighing mechanism being suspended by links engaging each other by knife-edges, as shown in Fig. 5.

There is no fixed point to serve as the fulcrum of a lever, the whole of the operating mechanism being swung by the links from the stationary frame on knife-edges, and it is the weight of the material entering the bucket that disengages the devices which hold the tilting bucket, and thus permits the bucket to be tilted by the same weight.

What I claim as new is—

1. In a device for weighing coal or the like, the combination with a suspended frame, of a tilting bucket pivoted thereon, notches in the side of the bucket, a lever normally spring-pressed into engagement with one of said notches, and means operated by the weight of the material being weighed to disengage said lever and permit of the tilting of the bucket, substantially as described.

2. In a device for weighing coal and the like, the combination with a frame, of a tilting bucket pivoted thereon and having a plurality of compartments with an opening at the top and bottom of each compartment, means whereby said bucket is held against tilting, means for disengaging the bucket operated by the descent of the bucket due to the weight of the substance being weighed, a supply-receptacle rigidly secured above the bucket and having a single discharge-opening, a table pivoted to the supply-receptacle below said opening, a freely-sliding weight on said table, and an arm extending downward from the table and directly engaging the tilting bucket, whereby the table is tilted by the movement of the bucket, substantially as described.

3. In a device for weighing a continuous stream of coal, or the like, the combination with a stationary supporting-frame, of links depending therefrom, levers fulcrumed at their outer ends on said links, a frame suspended from said levers at points inside their fulcrums, a tilting bucket pivoted on said suspended frame, means for securing the bucket against tilting, and connections between the inner ends of the levers and the securing means, substantially as described.

4. In a device for weighing a continuous stream of coal, or the like, the combination with a stationary supporting-frame, of links depending therefrom, levers fulcrumed at their outer ends on said links, a frame suspended from said levers at points nearer their fulcrums than their inner ends, a tilting bucket having a plurality of compartments and pivoted on said suspended frame, a cleat on the tilting bucket provided with a notch for each compartment, a bracket secured to the suspended frame, a latching-lever pivoted intermediate its ends to said bracket having its inner end normally engaged in the slot of the uppermost compartment of the bucket, and connections between the outer end of the latching-lever and the inner ends of the first-mentioned levers, substantially as described.

Signed at the city of New York this 21st day of March, 1901.

EWAN CAMERON.

Witnesses:
 HERMAN MEYER,
 MABEL K. WHITMAN.